Jan. 13, 1948.  G. J. KLEINER ET AL  2,434,321
METHOD OF WELDING
Filed March 8, 1944
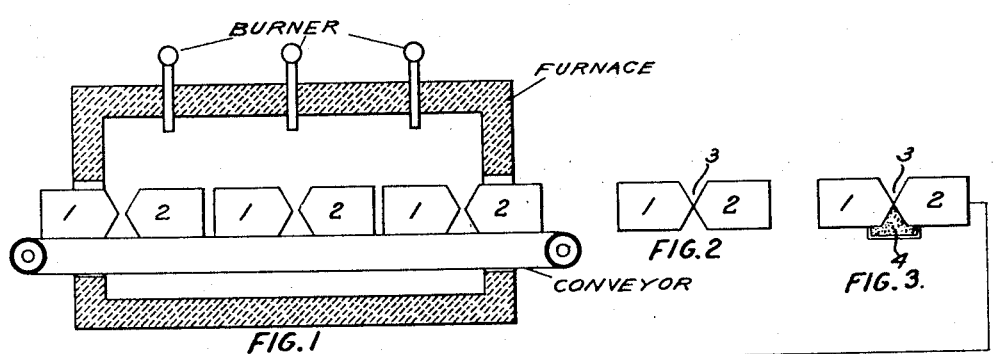
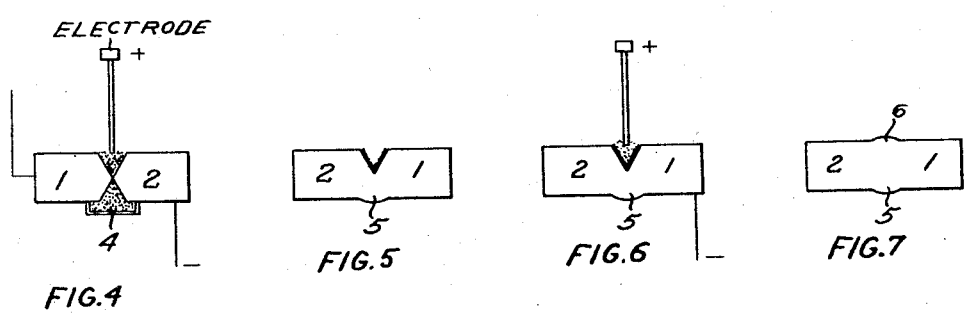
Inventors
George J. Kleiner
Willard Schumbacker
by W. A. Lieber
Attorney Patented Jan. 13, 1948

UNITED STATES PATENT OFFICE 2,434,321

METHOD OF WELDING

George J. Kleiner, South Milwaukee, and Willerd Schumbacker, West Allis, Wis., assignors to Allis-Chalmers Manufacturing Company, Milwaukee, Wis., a corporation of Delaware Application March 8, 1944, Serial No. 525,596

3 Claims. (Cl. 113—112)

The present invention relates generally to improvements in the art of welding and relates more particularly to a method of uniting metal parts by welding along both sides of a joint gap.

It has heretofore been common practice in welding metal parts to employ what is commonly known in welding as a backing-up strip, applied to the back surface of the parts to be welded along the gap or welding seam in an effort to prevent molten weld metal or the like from passing therethrough to the back surface of the weld and to seal the back of the gap against free access of air. Various metals such as copper and steel have been employed in the past as backing-up strips for weld joints, but such strips have proven objectionable for reasons as follows. It has been found that metallic strips often become distorted and otherwise deteriorate from the welding heat, frequently misalining the backing-up strip and the welding gap resulting in a loose backing through which the weld metal may pass to the back surface of the weld, thereby necessitating cleaning of the rear side after the front has been welded. In some instances, the metallic backing actually is welded to the parts and must be cut or chipped therefrom. Metal backing-up strips are furthermore often objectionable because of their heat-absorption property and tendency to conduct heat away from the weld, in some cases causing undesirable stresses or premature setting of the weld.

Various other materials have also been proposed for use as backing-up strips, but all of these materials have definite disadvantages and none of them has proven entirely satisfactory. One of the non-metallic materials heretofore used for backing weld seams is common welding flux. This type of backing-up strip has various advantages due primarily to the flexibility thereof and has proven satisfactory in certain instances, especially where the metal parts to be welded are of sufficient thinness that they may be welded throughout their cross-sectional area on a single pass or welding operation from one side thereof, and where specifications permit the parts to be held in spaced-apart relationship for the welding operation. This, however, is not always the case and working conditions often call for weld joints wherein it is necessary to weld both front and back sides of the seam or gap by separate operations. This may be true in cases wherein the parts to be welded are of such thickness as to prevent a through weld from one side only, and it is likewise the case where specifications require that the parts contact each other along a portion of their cross-sectional area.

In the prior art practice of welding adjacent metal parts through deposit of weld material in grooves, formed at opposite sides, between adjacent edges of the parts to be welded, it has been customary to provide a flux backing which fills the groove at that side of the parts to be welded which is opposite to the initial weld to be made. As a result of forming this initial weld, in accordance with prior art practice, the flux material used to fill the groove at the rear side of pieces to be welded becomes a fairly hard and solid slag formation which heretofore had to be carefully removed by chipping, grinding or the like to completely prepare the back side of the seam prior to welding that side. These additional cleaning and preparing operations undesirably add to the manufacturing expense and time consumed, but they have heretofore been found essential for the formation of good welds which will pass X-ray tests without showings of slag inclusions or other defects.

When flux is used for backing the weld, the back of the joint gap not only contains slag deposits but is also coated with fused flux in a semi-solid form after the front welding pass, and it has heretofore been necessary to remove both the slag and flux along the back gap preparatory to the welding thereof when uniformly good welds, free of slag inclusions and the like, are desired. We have discovered that complete removal of the slag and flux may be readily accomplished in a practical commercial manner to provide uniformally perfect welds without necessitating separate cleaning of the joint gap prior to the back welding pass. We accomplish this removal of the slag and flux by providing sufficient heat and forming the weld gap of sufficient width to permit complete melting of the objectionable slag and flux and its removal during the final welding operation. The weld metal deposited along the gap must be maintained in molten condition for a sufficient length of time to permit all of the slag and flux to percolate to the outwardly exposed surface thereof or slag and flux entrapment will occur, resulting in imperfect welds. The probability of slag and flux entrapment is materially increased where the gap to be welded is deep or narrow, since the deposit of metal will cool before the slag and flux has reached the outer surface thereof; and our improved method is therefore especially desirable in such instances.

It is therefore an object of the present invention to provide an improved method of welding which is especially applicable to work which requires a separate welding operation on both sides thereof and wherein the aforementioned difficulties are overcome and good welds are consistently formed.

Another object of this invention is to provide an improved method of welding wherein both sides of the parts to be united may be separately welded without the necessity of cleaning the second side prior to the welding thereof.

Another object of this invention is to provide an improved method of welding wherein front and back sides of the parts may be severally welded without entrapping slag or fused flux in the weld.

Another object of this invention is to provide an improved method of welding which reduces manufacturing time and expense to a minimum and which moreover produces a weld of maximum strength.

Another object of this invention is to provide an improved method of welding parts which are coated with a solidified fused flux without separately removing the flux.

Another object of the present invention is to provide an improved method of welding comprising, relatively positioning the parts to be welded to form a joint gap and providing a backing of fusible material, welding the front side of the gap, and finally welding the back of the gap in the presence of sufficient heat to completely melt the flux and slag and allow it to percolate therefrom.

These and other objects and advantages of the present invention will be apparent from the following detailed description.

A clear conception of the present improvement and the method of welding in accordance with the invention may be had by referring to the drawing accompanying and forming a part of this specification, wherein like reference characters designate the same or similar parts in the various views diagrammatically illustrating the several steps of our invention.

Fig. 1 is a diagrammatic sectional view through a furnace, showing several parts being preheated prior to the welding thereof;

Fig. 2 is a view showing two preheated parts relatively positioned for the initial welding operation;

Fig. 3 is a view showing the two preheated and relatively positioned parts provided with a flux backing along the gap or seam;

Fig. 4 is a view showing the two preheated and relatively positioned parts backed with flux and with a welding rod submerged in a bed of flux deposited along the front of the gap in position for the initial welding operation;

Fig. 5 is a view showing the two parts after completion of the initial welding operation, with the front gap welded and an accumulation of slag and fused flux along the back gap and with the parts reversed prior to the final welding operation;

Fig. 6 is a view of the initially united parts showing a welding rod in position for the final welding operation with the end thereof submerged in a bed of flux deposited along the back gap; and Fig. 7 is a view showing the finally united parts.

In carrying out the method of the present invention, the parts 1 and 2 to be united are preferably first preheated in the most convenient manner, as in a conventional furnace as shown in the drawing, to a temperature dependent upon several factors, such as thickness and characteristics of the material being welded and nature and intensity of the welding. After the parts have been preheated, they are placed in welding relationship with the joint gap or seam 3 backed with ordinary welding flux 4, which may be packed against the parts along the gap in any suitable manner so as to completely seal the back of the gap and prevent ready access of air to the weld. The initial welding pass or operation is effected to deposit a filling of welding material in the joint gap at the front side, as indicated at 5, while the parts are in preheated condition. Immediately after completion of the front weld, the position of the pieces is reversed and the back of the parts are welded along the joint gap through a deposit of welding material therein, as indicated at 6, while the parts are still in their preheated condition and without removing therefrom the slag or solidified fused flux deposited along the back of the gap from the front welding operation, the amount of heat present by virtue of the preheating, in addition to the weld heat, being sufficient to retain the weld metal in molten condition a sufficient length of time to permit all of the slag and solidified flux to percolate therethrough. Upon X-ray examination, the resultant weld will be found free of slag inclusions and other defects heretofore present when the back of the joint gap is not thoroughly separately cleaned of slag and fused flux after completion of the front weld and before starting the back weld.

If the parts to be united are of such size as to make preheating of the unit impractical or if the weld required is of such length that the parts will not remain in preheated condition until completion of both front and back passes, it may become necessary to preheat the parts prior to each welding pass. In any event, the weld metal should always be deposited on a portion of the parts which is, at the time of the welding, in properly preheated condition.

As stated above, the temperature to which the parts are to be preheated depends upon various factors. Welding flux ordinarily used in preferred modern seam welding has the characteristic of being non-conductive in its normal cold state and becomes conductive when subjected to relatively high heat. It is therefore desirable to heat the parts to such a temperature as to cause the more or less solidified flux in the back gap, following the deposit of the welding material in the front gap, to be in such condition as to reduce the amount of welding heat necessary to cause the flux to become conductive and fuse. It is also desirable to heat the parts sufficiently to materially reduce the amount of additional welding heat necessary to completely melt the slag and flux deposits along the back gap, thereby eliminating the necessity of the prior art practice of chipping and cleaning solidified slag or flux from the back gap. The metal, however, cannot be heated to its melting point or to such a high temperature that it will readily bend or distort. The temperature of preheat should also depend upon the type of welding being employed and the intensity of the final welding heat to be applied. If it is desirable to utilize the least amount of welding heat or lowest possible intensity, the parts should be preheated to the highest practical temperatures so that a lesser welding heat will cause the flux to fuse and become conductive and vice versa.

From the foregoing detailed description, it is apparent that the present invention provides an improved method of welding wherein a flexible weld backing of the flux material is utilized to seal the gap between the parts being united and wherein time, effort and expense are reduced to a minimum without detracting from the quality of the final weld. In addition to the flexibility of the flux backing seal, the material utilized is of such nature that it does not undesirably absorb heat from the parts, thus reducing objectionable stresses and premature setting of the weld to a minimum and aiding in maintaining the parts in preheated condition for a maximum length of time. The improved method has proven highly successful and efficient in every respect in actual commercial use, and the welds produced thereby are meeting exceptionally rigid requirements and tolerances in an entirely satisfactory manner.

While the improved method is especially adapted to electric arc welding, it is not the intention to restrict the scope of the invention thereto as it may be applied to other types of welding operations within the scope of the claims.

It is claimed and desired to secure by Letters Patent:

1. The method of welding wherein the welding is effected in separate passes from opposite sides, which comprises, preheating and relatively positioning the parts to be united to provide a front and a back gap, providing a flux backing along said back gap, welding said front gap, leaving in said back gap the deposit of flux and slag adhering thereto as a result of said front gap welding operation, and welding said back gap while said parts are at a temperature sufficiently high so that said deposit may be rendered fluid by said back gap welding operation at a weld heat which will leave said parts undamaged and produce an inclusion-free weld, said preheating being sufficient so that along with the weld heat produced by said front gap welding operation said temperature will be available while said back gap is being welded.

2. The method of welding wherein the welding is effected in separate passes from opposite sides, which comprises, relatively positioning the parts to be united to provide a front and a back gap, providing a flux backing along said back gap, welding said front gap, leaving in said back gap the deposit of flux and slag adhering thereto as a result of said front gap welding operation, preheating said parts, and welding said back gap while said parts are at a temperature sufficiently high so that said deposit may be rendered fluid by said back gap welding operation at a weld heat which will leave said parts undamaged and produce an inclusion-free weld, said preheating being sufficient so that said temperature will be available.

3. The method of welding wherein the welding is effected in separate passes from opposite sides, which comprises, relatively positioning the parts to be united to provide a front and a back gap, providing a flux backing along said back gap, welding said front gap by a welding operation which includes heating the parts and depositing weld metal in said front gap, leaving in said back gap the deposit of flux and slag adhering thereto as a result of said front gap welding operation, and welding said back gap while said parts are still at a temperature sufficiently high by reason of said front gap welding operation so that said deposit may be rendered fluid by said back gap welding operation at a weld heat which will leave said parts undamaged and produce an inclusion-free weld.

GEORGE J. KLEINER.
WILLERD SCHUMBACKER.

REFERENCES CITED

The following references are of record in the file of this patent:

UNITED STATES PATENTS

| Number | Name | Date |
|---|---|---|
| 2,122,994 | Southgate | July 5, 1938 |
| 2,249,723 | Orr | July 15, 1941 |
| 2,145,009 | Keir | Jan. 24, 1939 |

OTHER REFERENCES

Welding Handbook, 1942 ed., pub. by Amer. Welding Soc., New York, N. Y., ch. 7, pp. 245, 246, 251, 259, 260 and 264.